(12) United States Patent
Nyfors

(10) Patent No.: US 7,481,118 B2
(45) Date of Patent: Jan. 27, 2009

(54) FLOW MEASUREMENT APPARATUS

(75) Inventor: Ebbe Gustaf Nyfors, Sandnes (NO)

(73) Assignee: Roxar Flow Measurement AS (NL)

( * ) Notice: Subject to any disclaimer, the term of this patent is extended or adjusted under 35 U.S.C. 154(b) by 0 days.

(21) Appl. No.: 11/883,575

(22) PCT Filed: Jan. 26, 2006

(86) PCT No.: PCT/NO2006/000035

§ 371 (c)(1),
(2), (4) Date: Dec. 3, 2007

(87) PCT Pub. No.: WO2006/083170

PCT Pub. Date: Aug. 10, 2006

(65) Prior Publication Data

US 2008/0148867 A1    Jun. 26, 2008

(30) Foreign Application Priority Data

Feb. 3, 2005  (NO) .................................. 20050592

(51) Int. Cl.
*G01F 1/00* (2006.01)
(52) U.S. Cl. .................................................... 73/861
(58) Field of Classification Search .............. 73/861, 73/152.28, 61.44; 324/71.4
See application file for complete search history.

(56) References Cited

U.S. PATENT DOCUMENTS

| 4,829,831 | A | 5/1989 | Kefer et al. |
| 6,272,915 | B1 * | 8/2001 | Kostelnicek et al. ..... 73/152.28 |
| 6,420,882 | B1 | 7/2002 | Engebretsen et al. |
| 6,426,615 | B1 * | 7/2002 | Mehta ....................... 324/71.4 |
| 6,655,221 | B1 | 12/2003 | Aspelund et al. |
| 2004/0244501 | A1 | 12/2004 | Nyfors et al. |
| 2005/0188771 | A1 | 9/2005 | Lund Bo et al. |

FOREIGN PATENT DOCUMENTS

| GB | 2 313 445 A | 11/1997 |
| JP | 11-064067 | 3/1999 |
| NO | 307393 | 10/1998 |

OTHER PUBLICATIONS

International Search Report for PCT/NO2006/000035 mailed May 30, 2006.

(Continued)

*Primary Examiner*—Jewel Thompson
(74) *Attorney, Agent, or Firm*—Nixon & Vanderhye PC

(57) ABSTRACT

An apparatus for obtaining information on the content and flow rate in a fluid flow, e.g. a mixture of oil and water flowing in, for example, a pipe, including means for conveying a flowing fluid, means for generating a differential pressure in said fluid, and means for measuring said differential pressure. Means for measuring a capacitance are provided including at least one electrode, and the differential pressure generating means is arranged substantially at the same position along the pipe as the electrode of the capacitance measuring means. Thereby the differential pressure generating means effectively defines an earth electrode for said capacitance measuring means. Means are provided for combining a result from said differential pressure measuring means with a result from said capacitance measuring means to thereby obtain information on the content and flow rate in a fluid flow.

18 Claims, 7 Drawing Sheets

OTHER PUBLICATIONS

Norwegian Search Report for Priority Application 20050592.
Written Opinion of the International Search Authority for PCT/NO2006/000035.
ISO 5167-1 Measurement of fluid flow by means of pressure differential devices (2003).
Schüller et al., "Measurement of Water Concentration in Oil/Water Dispersions with a Circular Single-Electrode Capacitance Probe", IEEE Transactions on Instrumentation and Measurement, vol. 53, No. 5, pp. 1378-1383 (2004).

* cited by examiner

FLOW MEASUREMENT APPARATUS

This application is the U.S. national phase of international application PCT/NO2006/000035 filed 26 Jan. 2006 which designated the U.S. and claims benefit of NO 20050592, dated 3 Feb. 2005, the entire content of which is hereby incorporated by reference.

The present invention is related to measurement of the contents of a fluid flow. More particularly, the present invention is related to the measurement of a fluid flow in a pipeline containing a mixture of hydrocarbons and water.

BACKGROUND OF THE INVENTION

In the oil and gas exploitation and supplying industry there is a requirement for monitoring the state of the fluid flowing in the pipelines. The composition and individual flow rates of a mixture of gaseous hydrocarbons, liquid hydrocarbons (oil or condensate) and water are important flow parameters.

The present applicant/inventors have for a number of years developed solutions to improve the information available about the state of such fluid flows and have gathered experience in the field as to how present measurement solutions operate and fulfill the desired objectives.

DESCRIPTION OF THE STATE OF THE ART

This application is partially based on previous solutions developed by this applicant.

In Norwegian Patent 315.584, it has been described an apparatus for the measurement of the composition and flow rates of a fluid comprising a mixture of e.g. oil and water in a pipe, wherein an integrated mechanical structure serves as a microwave resonator sensor for providing permittivity measurements and where the mechanical structure also works as a differential pressure element for providing flow rate measurements. By combining the results from the microwave resonator sensor and the differential pressure elements the determination of the composition and flow rates for the individual components of the fluid flow is enabled.

In Norwegian Patent Application NO20040886 it has been described a three-phase wet gas metering solution that is capable of measuring the individual flow rates of gas, liquid hydrocarbons and water in a wet gas pipe flow. This solution uses a combination of a water content meter and a double differential pressure generating and measuring structure to obtain the desired measurement results. The double differential pressure generating and measuring structure is arranged to provide measurement signals representing two independent values of differential pressure (DP) in the fluid. A signal processing unit capable of receiving the measurement signals and the water content signal includes a calculation module for calculating values representing the volumetric flow rates of the gas, liquid hydrocarbon and water in the fluid.

A well known technique used in multi-phase measurements is the measurement of capacitance, exemplified in Norwegian Patent no. 307393. The dielectric permittivity of a mixture is obtained by measuring capacitance using plate shaped electrodes, mounted near or in direct contact with a flow in a pipe. The shape and size of the electrodes determine which part of a cross section of a pipeline the electrodes cover. In the solution disclosed in Norwegian Patent no. 307393 is based on the detection of periods with a fall in the measured permittivity, and devices for the estimation of the oil/water fraction based on the measurements of permittivity outside the periods with a fall in the permittivity.

In Norwegian Patent no. 310322 there is disclosed a method and a measuring system which utilizes a measurement of electrical fields to determine the electrical characteristics of phases in a multi-phase mixture constituting a fluid flow through a conduit. This is used as part of the determination of the phase fractions. Further, time-varying signals from at least one pair of detectors are used for the electrical characteristics of the fluid, combined with the use of a cross-correlation for determining one or several velocities in the flowing fluid. Additionally, one or several pressure drops are measured across, or adjacent to, a narrow passage. By combining measurements of the electrical characteristics, with measurements of pressure drop, the fractions of all phases in the flow are determined. Combined with measurements of the velocities, the volume flow rates are calculated for the phases and by further combining this with the mass densities of the phases, the mass flow rates of the phases are determined. "Measurements of Water Concentration in Oil/Water Dispersions with a Circular Single-Electrode Capacitance Probe", by Schüller & al., published in IEEE Transactions on Instrumentation and Measurement, Vol. 53, No. 5, October 2004, pp 1378-1383, describes a measurement method used to measure the water content in an oil/water dispersion. The method is based on an oscillator working at a given frequency, and where the dielectric property of the medium adjacent to one single free electrode affects the frequency of the oscillator.

In Norwegian patent application NO971791 there is disclosed a flow meter for measuring the flow rates of individual phases of a multiphase flow comprises two capacitive sensors consisting of electrodes attached to a conduit through which the fluid under test flows. The sensors are spaced a known distance apart along the conduit and the sensor signals are cross-correlated to determine flow speed, the speed signals being used in a flow rate calculating circuit to give a measure of flow rate. Signals relating to individual phases are provided by operating the sensors at various different frequencies, making use of the fact that the dielectric constants of the various phases alter with frequency in different ways.

The solutions known to this applicant for three-phase measurement in fluids relying on microwave frequency signals for providing a measurement and for processing the detected signals requires a number of microwave frequency components, such as microwave electronics and high frequency signal processing capable units. It has been continuing requirement of the development process to strive to simplify the required electronics circuitry in such a measuring apparatus.

THE OBJECT OF THE INVENTION

It is thus an object of the present invention to provide flow metering apparatus for the measurement in three phase fluid flows which is a simplification as compared to present measurement apparatuses.

It is also an object of the present solution to provide a flow metering apparatus which reduces the total manufacturing and maintenance cost of a fluid flow metering apparatus by reducing the number of required microwave frequency components.

THE INVENTION

The objects of the invention are achieved by an apparatus for obtaining information on the content and flow rate in a fluid flow, e.g. a mixture of oil and water flowing in, for example, a pipe, comprising means for conveying a flowing fluid, means for generating a differential pressure in said fluid passing through said means for conveying, and means for measuring said differential pressure. The apparatus is characteristic in that means for measuring a capacitance comprises at least one electrode, that the means for generating a differential pressure is arranged substantially at the same position along the pipe as the at least one electrode of the capacitance measuring means, and that said differential pressure generating means effectively defines an earth electrode for said capacitance measuring means. The apparatus is further characteristic in means for combining a result from said means for measuring a differential pressure with a result from said means for measuring a capacitance of a volume of said flowing fluid for thereby to obtain information on the content and flow rate in a fluid flow, and the means for measuring a capacitance of a volume is arranged generally in a same section of the fluid conveying means as said means for generating a differential pressure. In one embodiment of the apparatus for obtaining information on the content and flow rate in a fluid flow according to the invention comprises a voltage supply circuit for applying an electric voltage between the at least one electrode and the means for generating a differential pressure thereby generating an electric field between said at least one electrode and the means for generating a differential pressure. Thereby a major part of said electric field is directed substantially in a radial direction inside said conveying means due to said arrangement generally in a same section of the fluid conveying means.

In another embodiment of the apparatus according to the invention a signal processing unit is coupled to the pressure measuring circuits and the capacitance measuring circuit for providing an estimate related to the content and flow rate in said fluid flow.

In yet another preferable embodiment of the apparatus according to the invention the integrated structure is a V-cone element.

In a further preferable embodiment of the apparatus according to the invention at least one electrode is arranged in a section of said pipe adjacent to a thick end of said V-cone element.

In a still further embodiment of the apparatus according to the invention at least one electrode is arranged in a section of said pipe near said V-cone element.

In a yet still further preferable embodiment of the apparatus according to the invention a number of electrodes is arranged circumferentially along a circular section of said pipe.

In a yet still further preferable embodiment of the apparatus according to the invention a number of electrodes is arranged along a longitudinal direction of said pipe.

In yet another farther preferable embodiment of the apparatus according to the invention an electrode is arranged in a dielectric layer of said pipe.

In another preferable embodiment of the apparatus according to the invention the dielectric layer is an annularly shaped structure.

In another preferable embodiment of the apparatus according to the invention the dielectric layer is arranged along a part of the internal surface of said pipe facing a wide part of said means for generating a differential pressure.

In still another preferable embodiment of the apparatus according to the invention an auxiliary electrode at a location in the pipe placed a distance away from the position in the pipe containing said differential pressure generating means.

In yet still another preferable embodiment of the apparatus according to the invention an electrically isolating part arranged between at least one of the electrodes or the auxiliary electrodes and the flowing medium.

In a still further preferable embodiment of the apparatus according to the invention at least one electrode or auxiliary electrode is arranged with a surface in contact with said medium.

In yet another preferable embodiment of the apparatus according to the invention the means for combining a result form said means for measuring a differential pressure with a result from means for measuring a capacitance includes computer program means arranged in a computing unit.

DETAILED DESCRIPTION OF THE INVENTION

The invention will now be described in more detail with reference to the drawings where FIG. 1 shows a semi-sector integrated mechanical structure and multiple electrodes for capacitance measurement arranged adjacent to the mechanical structure.

The invention comprises three main functional parts, a pressure measuring part, a capacitance measuring part and a signal processing unit. FIGS. 1-6 illustrates various configurations of pressure measuring parts and capacitance measuring parts of an apparatus for measurement of the content and flow rate in a fluid flow according to the invention. FIG. 7 illustrates one general configuration of the signal processing unit of an embodiment of an apparatus according to the invention and its input signal units.

Figure 1:
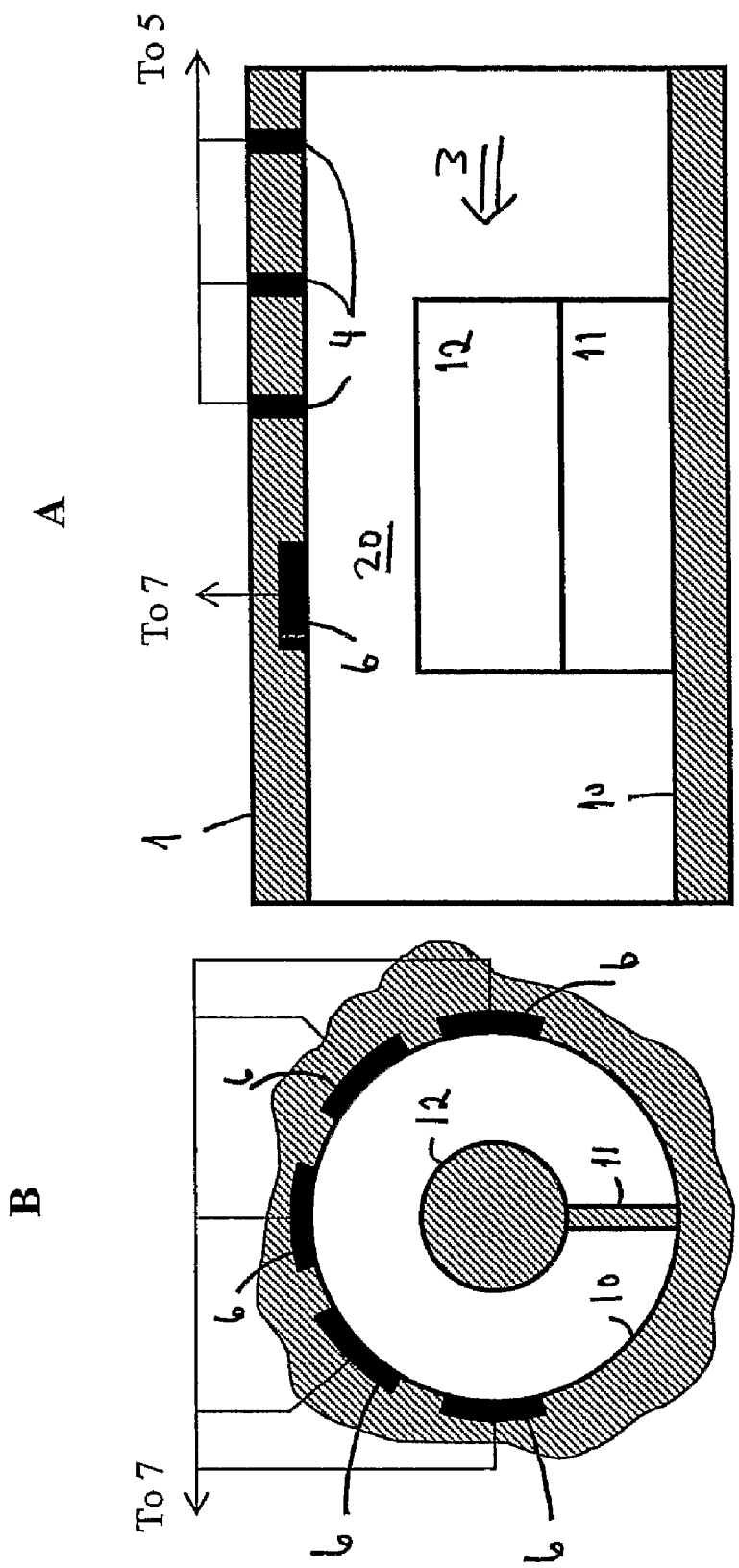

FIG. 1 illustrates means for conveying a fluid, in this example a pipe 1 of generally circular cross section which allows a fluid to flow through it. Although this example shows a pipe of circular cross section, any other suitable cross section could be used. Inside the conveying means there is arranged means for generating 2 a differential pressure in said fluid 3. The means for generating 2 a differential pressure is generally an integrated mechanical structure, as illustrated in FIG. 1 a cylindrically shaped element is attached to the pipe wall, for example using a fin 11, which could be a metal fin welded to the inside surface of said pipe wall at one end and at the other end to the cylinder shaped element. Said cylinder shaped element may be located centrally in said pipe interior volume. When a fluid 3 flows through the pipe 1 a differential pressure is generated at the cylinder element arranged inside the pipe 1. In the pipe wall 12 there are provided pressure measuring means 4 which could be in the form of a pressure tap, i.e. a pressure sensing device connected to a suitable pressure measuring circuit 5 for transforming a signal from said sensing device into an electric signal, analogue and/or digital, which is suitable for further processing, in an analogue and/or digital signal processor device 13. At least two pressure taps are arranged so as to be subject to the differential pressure generated by said differential pressure generating means 2.

In FIG. 1 there are three pressure taps 4 arranged located at different positions along said pipe, and near or adjacent to one end of the differential pressure generating means 2. Even though in this invention only two pressure taps 4 are required to achieve the objectives of the invention, the use of three pressure taps may in some configurations provide additional benefit in that a double differential pressure signal is obtainable. Various double differential pressure configurations are disclosed and described in Norwegian Patent Application No. 2004.0886 and is hereby incorporated by reference. Upon reading the present disclosure and understanding the inventive concept herein, a person skilled in the art will understand that several of the configurations of pressure taps located at different positions along a pipe containing a differential pressure generating means which are presented in NO 2004.0886 could or varieties thereof could be used as a differential pressure generating means in this invention.

In part A of FIG. 1 there is illustrated a single electrode 6 placed so as to be near or in contact with the interior volume of said pipe. The electrode can be an integrated part of said pipe wall 12, in such a manner that the electrode surface is flush with the interior of the pipe 1. The electrode 6 may have protective coating facing the fluid in order to prevent or reduce corrosive or abrasive effects of the flowing fluid.

In part B of FIG. 1 there is illustrated how several electrodes 6 may be arranged at different positions around a cylindrical section of said pipe 1. In the example all the electrodes are coupled together with a common connection to a capacitance measuring circuit 7. It should be noted however that the electrodes 6 could each be connected on an individual basis to a number of corresponding individual capacitance measuring circuits. In the event that each individual electrode 6 has an individual capacitance measuring circuit 7, a capacitance measurement could involve the use of any combination of individual electrode measurement, at the same time, at consecutive moments in time or sequenced in any suitable manner.

In addition to the parts illustrated in FIG. 1, a complete apparatus according to the invention also includes an electronic pressure measuring circuit 5, possibly one individual pressure measuring circuit 5 per pressure tap. A complete apparatus according to the invention also includes an electronic capacitance measuring circuit 7. The electronic pressure measuring circuit 5 and the electronic capacitance measuring circuit 7 are connected to a signal processor unit 13 for calculating information on the content and flow rate in the fluid flow 3. Based on the signal from the differential pressure measuring circuit the mass flow is calculated in signal processing unit 13, for example as described in standard ISO 5167-1 (*Measurement of fluid flow by means of pressure differential devices*), the content of which is hereby incorporated by reference. Based on the signal from the capacitance measuring circuit 7 the composition of the fluid can in the case of a two-phase flow be calculated in 13 for example based on an empirically calibrated model. In the case of for example three phase flow (for example gas, water, and condensate) additional information is needed. This can be acquired for example through standard so-called PVT-calculations, which give the relative amounts of gas and condensate based on thermodynamic calculations. When the composition and the total mass flow are known the mass flow of the individual constituents are easily calculated in signal processing unit 13.

Figure 2:
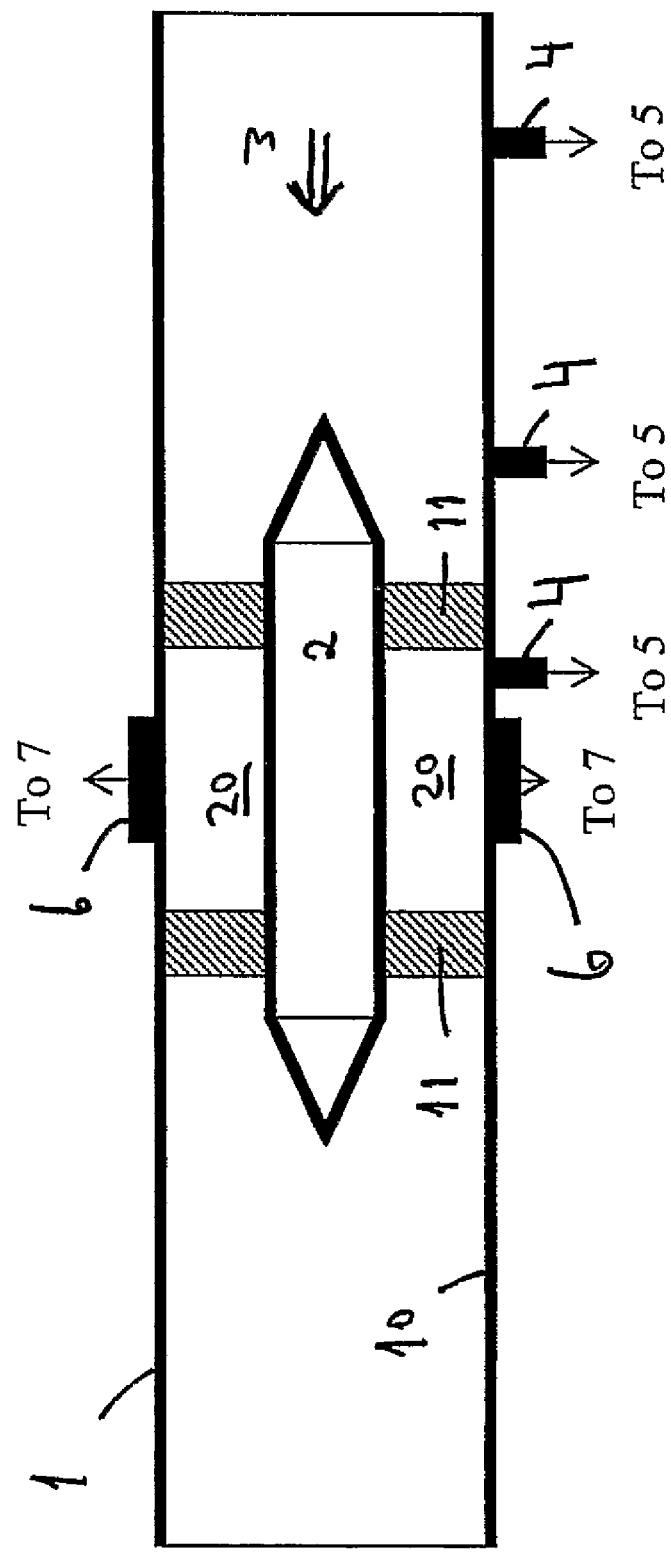
FIG. 2 shows a coaxial element inserted into a pipe with electrodes arranged adjacent to the coaxial element.

FIG. 2 illustrates another embodiment of the parts of the invention arranged in or at the pipe 1. The differential pressure generating structure 2 is a cylindrical element having conical end sections. In this example the differential pressure generating structure 2 is attached to the interior pipe wall 10 using two fins 11, arranged generally at opposite ends of the differential pressure generating structure 2. Two electrodes 6 are shown for enabling a capacitive measurement of the fluid flow and three pressure taps 4 are shown for enabling a double differential pressure measurement.

Figure 3:
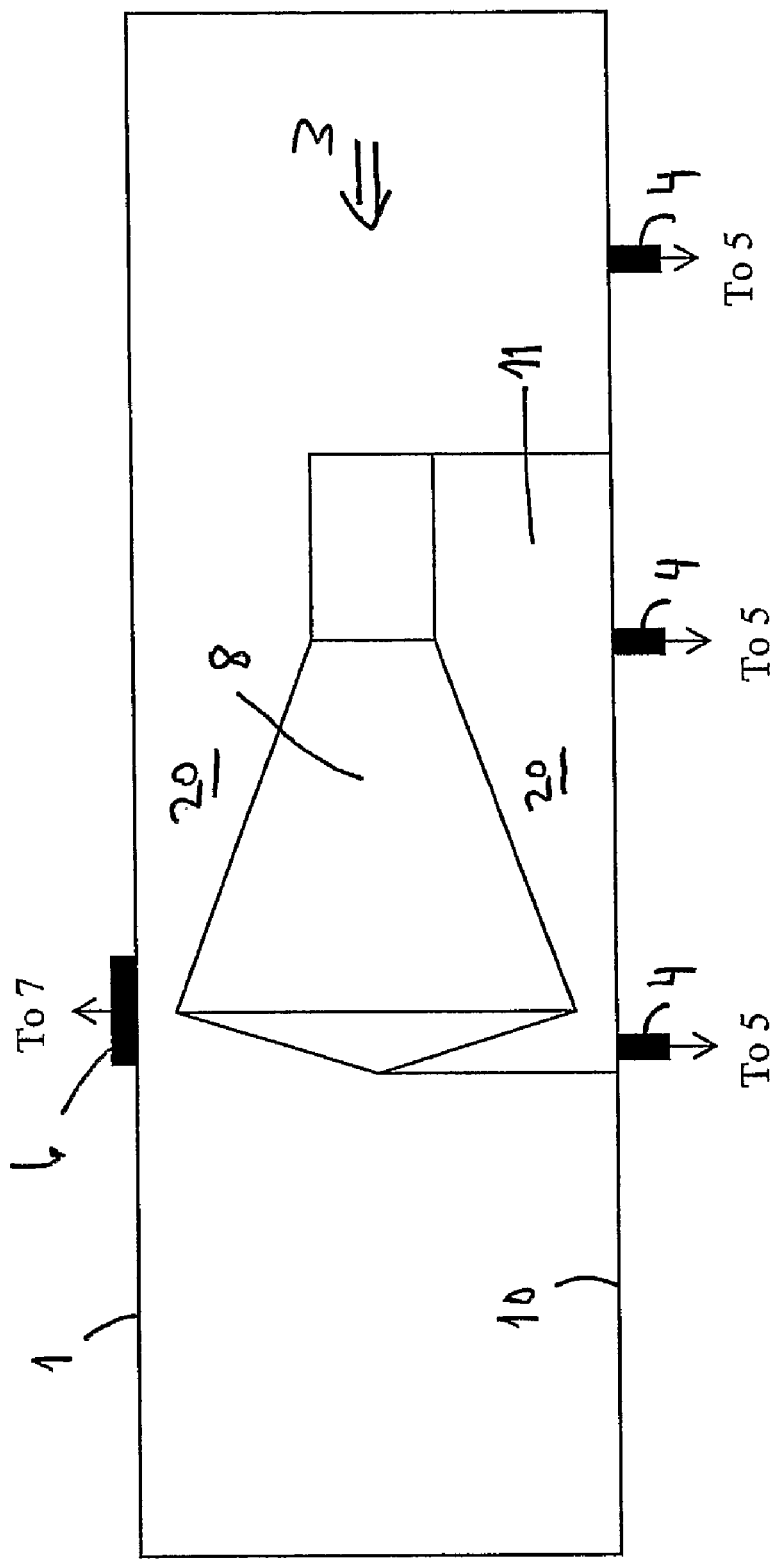
FIG. 3 shows a V-cone structure with a fin-like support structure along its full length for creating a differential pressure and electrodes mounted along the pipe exterior wall adjacent to the V-cone for capacitance measurement.

FIG. 3 illustrates yet another example of the parts of the invention arranged in or at the pipe 1 where a differential pressure generating structure 2 is realised as a V-cone element 8 attached to the interior wall 1 of said pipe 1 using a fin 11 running along the pipe 1 in a longitudinal direction and along the full length of the V-cone element 8. Pressure taps 8 for connection to electronic pressure measuring circuits 5 and an electrode 6 coupled to an electronic capacitance measuring circuit 7 are also illustrated.

Figure 4:
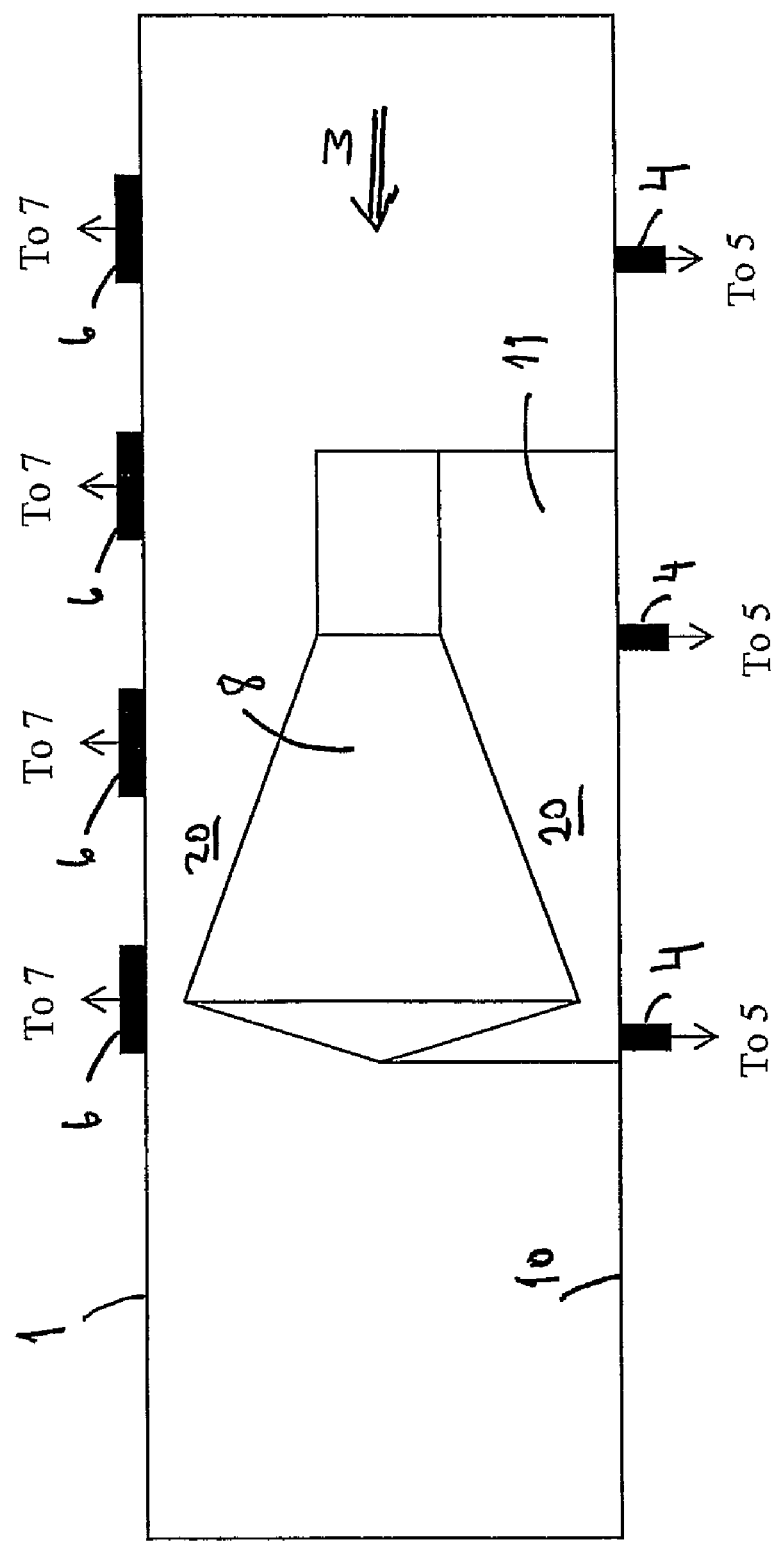
FIG. 4 shows a standard V-cone structure mounted inside a pipe using a single fin support and electrodes for enabling a capacitance measurement.

FIG. 4 illustrates an example similar to the one in FIG. 3, but in this case a number of individual electrodes 6 are arranged at different positions along a longitudinal direction of the pipe 1 and adjacent to the differential pressure generating structure 2. The individual electrodes 6 are in this case connected together. Although FIG. 4 as well as some of the other figures illustrates an arrangement with a single fin, it will be understood that two or more fins could also be used to attach the differential pressure generating structure 2 to the pipe 1. Although one or more fins are the preferred attachment means for attaching the differential pressure generating structure 2 to the pipe 1, other attachment means, such as for example one or more axial taps as shown in FIG. 5 could be used for making this attachment.

Figure 5:
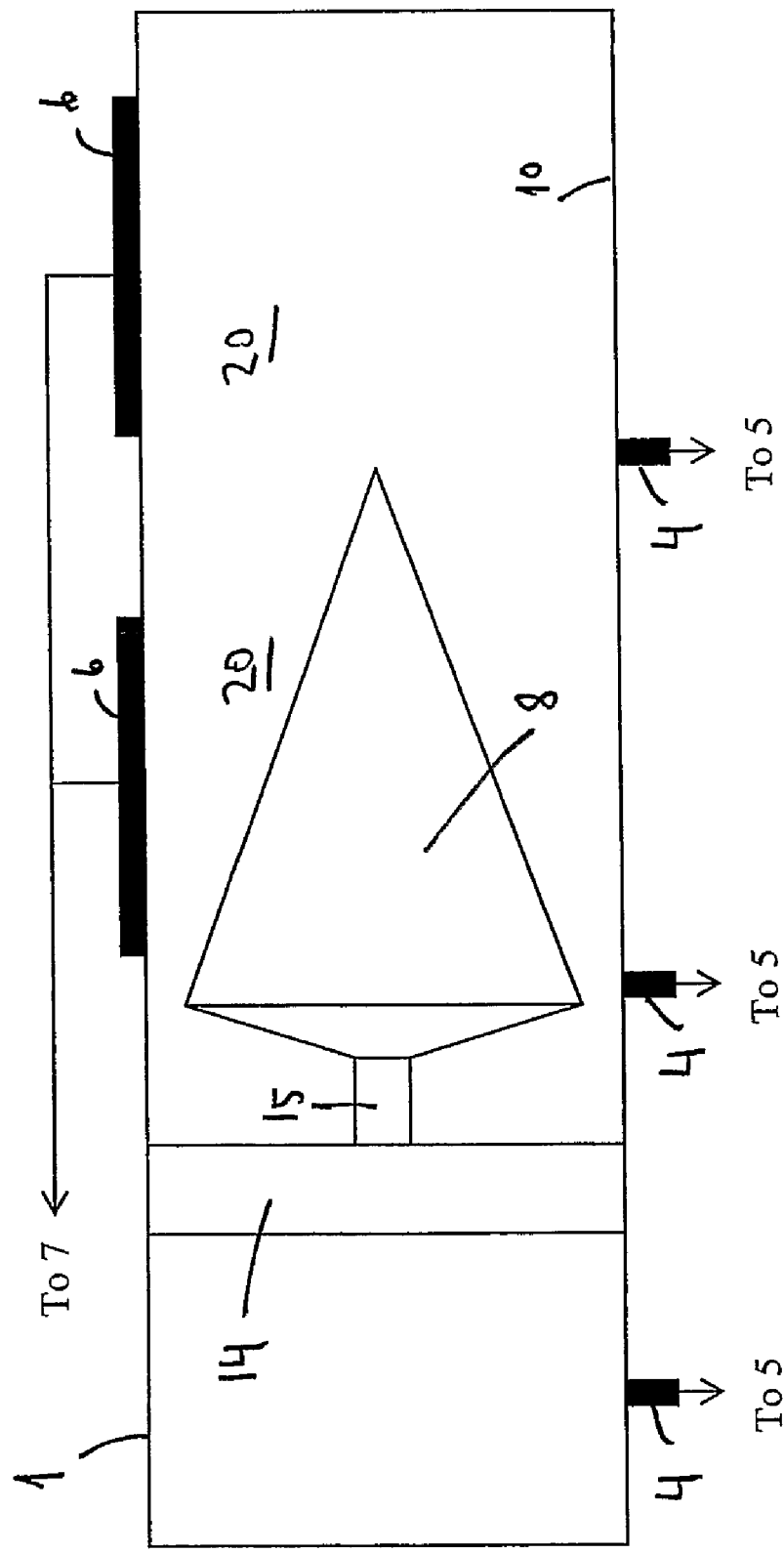
FIG. 5 shows a V-cone structure mounted inside a pipe using a bar running across an internal cross section of the pipe and electrodes for performing a capacitance measurement in the fluid flow.

FIG. 5 illustrates another arrangement of the differential pressure generating structure 2 of the invention in a pipe 1. The differential pressure generating structure is a V-cone element 8. The V-cone element 8 is conical at both ends, but slanted at different angles. At the end with the steepest slant, the conic end is attached to an axial tap 15 connecting the V-cone 8 mechanically to a single bar 14. The bar 14 is attached to the interior surface of said pipe 1.

The example of FIG. 5 illustrates how an electrode 6 is situated along the interior wall 10 of the pipe 1 and along substantially most of the length of the V-cone element 8. In addition to electrode 6 there may be provided an auxiliary electrode 6A displaced somewhat along the pipe as compared to the main electrode 6. In FIG. 5 the auxiliary electrode is connected in common with electrode 6 to the capacitance measuring circuit 7, however, the electrode 6 and electrode 6A could be coupled to separate individual capacitance electrodes. In this manner a capacitance measurement using electrode 6 provides a measurement of the full volume between the electrode and the differential pressure generating element, i.e. across substantially a full fluid flow cross section. A capacitance measurement using the auxiliary electrode 6A will yield a capacitance measurement dominated by the volume of the flow adjacent or near the pipe wall. In some flow regimes the properties of the flow near the pipe wall differs significantly from the properties of the rest of the flow cross section, hence it may be beneficial to have both these measurements available.

Figure 6:
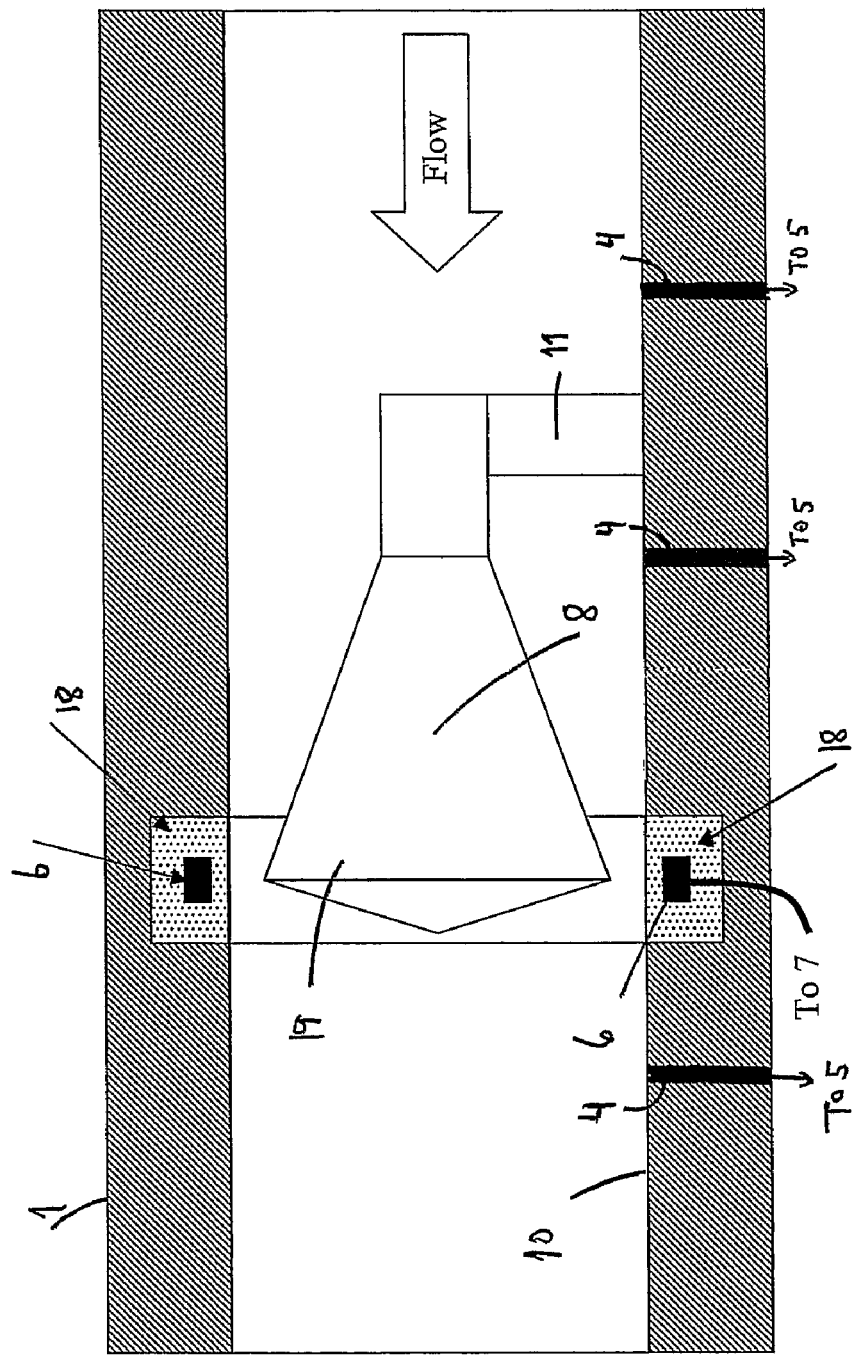
FIG. 6 illustrates another embodiment of an arrangement of electrodes and a V-cone with a single support in the apparatus according to the invention.
Figure 7:
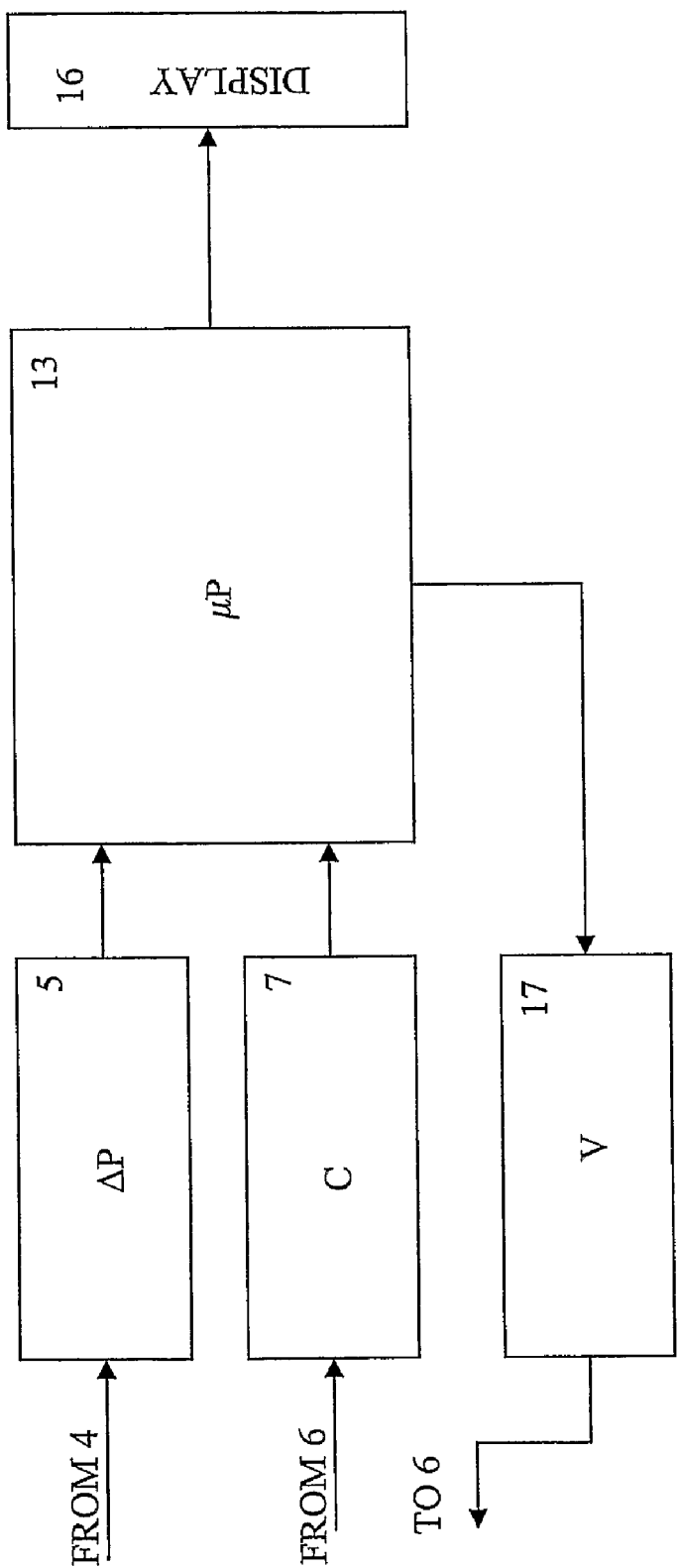
FIG. 7 illustrates the signal processing unit of an embodiment of an apparatus according to the invention.

FIG. 6 illustrates yet another embodiment of an arrangement of electrodes 6 and V-cone element 8 with a single support 11 in the apparatus according to the invention. In this example capacitive electrodes 6 are arranged buried in a dielectric isolating layer 18 which typically forms an annular element of the pipe 1. The dielectric layer 18 or annular element is designed as a depression or groove-like structure at the inside surface of the pipe with a part of its surface facing the internal volume of the pipe 1. The dielectric layer 18 may be a complete annulus running all around inside a full inner, annularly shaped depression in the inside surface of the pipe. Alternatively, the dielectric layer 18 is formed as one or more segments of an annulus around the inside surface of the pipe 1. The capacitive electrodes 6 are connected to the capacitance measuring circuit 7 by a connecting cable or wire which may run through some of the dielectric and the pipe wall to the outside of the pipe 1. The dielectric layer/electrode structure is arranged in the part of the pipe wall that is nearest to a wide part 19 of the V-cone. Although FIG. 6 shows an electrode 6 surrounded by a dielectric 18, a dielectric 18 and an electrode 6 could be arranged such that the surface or a part of the surface of a electrode 6 is in physical contact with the fluid flow 3.

In all embodiments illustrated herein it is a main feature of this invention that the differential pressure generating structure 2 is arranged substantially at the same position along the pipe 1 as the electrodes 6, in order that said differential pressure generating structure defines an earth potential for said electrodes 6, whereby an electric field is formed between at least one of said electrodes 6 and said differential pressure generating structure having substantially radial field lines in a volume inside said pipe 1.

FIG. 7 illustrates how a signal processor 13 receives input signals from a pressure measuring circuit 5 and a capacitance measuring circuit 7 for further processing and an output to, e.g. a display device, for presentation to a user or to a storage unit, e.g. a volatile electronic digital memory such a DRAM for temporary storage or a non-volatile unit, such as a digital disc or magnetic tape station, for long term storage of the information resulting from the processing in the signal processor 13. A voltage supplying circuit 17 is provided for supplying the electrode with a voltage signal, said supplying circuit 17 being controlled by a computer program in a computing unit, e.g. a microprocessor. The computer program performing the signal processing can be realised in hardware and/or software.

Although the figures accompanying this description illustrates one or a few electrodes, one or a few pressure taps and one or a few attachments means for attaching the structure for generating a differential pressure in said flow, it is intended that the any number of electrodes, pressure taps and attachment means for the differential pressure generating structure which are found to be practical in each situation and which satisfies the condition that the differential pressure generating structure 2 is arranged substantially at the same position along the pipe 1 as the electrodes 6 will be possible within the scope of this invention. Further it should be understood that, depending for example on the design of the differential pressure generating structure 2, the corresponding electrodes 6 may take a variety of forms and still fall within the scope of this invention.

The invention claimed is:

1. Apparatus obtaining information on the content and flow rate in a fluid flow, e.g. a mixture of oil and water flowing in, for example, a pipe, comprising means for conveying a flowing fluid,
means for generating a differential pressure in said fluid passing through said means for conveying said fluid flow, the means for generating a differential pressure being position inside said conveying means, said differential pressure generating means is a having a conical surface against the flow direction,
means for measuring said differential pressure,
means for measuring a capacitance comprising at least one electrode arranged in a section of said pipe adjacent to the thick end of said conical surface,
said differential pressure generating means effectively constitutes an earth electrode for said capacitance measuring means, the electrical field between said pressure generating means and said at least one electrode thus having substantially radial field lines in the volume inside the means for conveying the flowing fluid, and
means for combining a result from said means for measuring a differential pressure with a result from said means for measuring a capacitance of a volume of said flowing fluid for thereby to obtain information on the content and flow rate in a fluid flow.

2. Apparatus according to claim 1, comprising a voltage supply circuit for applying an electric voltage between the at least one electrode and the means for generating a differential pressure thereby generating an electric field between said at least one electrode and said means for generating a differential pressure, and whereby a major part of said electric field is directed substantially in a radial direction inside said conveying means due to said arrangement generally in a same section of the fluid conveying means.

3. Apparatus according to claim 1, comprising a signal processing unit coupled to said pressure measuring circuits and said capacitance measuring circuit and for providing an estimate related to the content and flow rate in said fluid flow.

4. Apparatus according to claim 1, comprising at least one additional electrode arranged in a section of said pipe near said V-cone element.

5. Apparatus according to claim 1, where said at least one electrode is constituted by a number of electrodes arranged circumferentially along a circular section of said pipe.

6. Apparatus according to claim 1, comprising a number of additional electrodes arranged along a longitudinal direction of said pipe.

7. Apparatus according to claim 1, comprising an electrode arranged in a dielectric layer of said pipe.

8. Apparatus according to claim 7, wherein the dielectric layer is an annularly shaped structure.

9. Apparatus according to claim 7, wherein said dielectric layer is arranged along a part of the internal surface of said pipe facing a wide part of said means for generating a differential pressure.

10. Apparatus according to claim 1, comprising an auxiliary electrode at a location in the pipe placed a distance away from the position in the pipe containing said differential pressure generating means.

11. Apparatus according to claim 1, comprising an electrically isolating part arranged between at least one of the electrodes or auxiliary electrodes and the flowing medium.

12. Apparatus according to claim 1, wherein at least one of the electrodes or the auxiliary electrodes is arranged with a surface in contact with said medium.

13. Apparatus according to claim 1, wherein said means for combining a result form said means for measuring a differential pressure with a result from means for measuring a capacitance includes computer program means arranged in a computing unit.

14. Apparatus obtaining information on the content and flow rate in a fluid flow, e.g. a mixture of oil and water flowing in, for example, a pipe, comprising means for conveying a flowing fluid,
means for generating a differential pressure in said fluid passing through said means for conveying said fluid flow, the means for generating a differential pressure being position inside said conveying means, means for measuring said differential pressure, at least one electrode close to the inner surface of said means for conveying a fluid and arranged substantially at the same position along the pipe as the means for generating a differential pressure, a voltage supply circuit for applying an electric voltage between the at least one electrode and the means for generating a differential pressure, means for measuring a capacitance between said at least one electrode and said means for generating a differential pressure, and means for combining a result from said means for measuring a differential pressure with a result from said means for measuring a capacitance of a volume of said flowing fluid for thereby to obtain information on the content and flow rate in a fluid flow said means for measuring a capacitance of a volume is arranged generally in a same section of the fluid conveying means as said means for generating a differential pressure.

15. Apparatus according to claim 14, wherein said at least one electrode are positioned so as to generate an electrical field between said pressure generating means and said at least one electrode having substantially radial field lines in the volume inside the means for conveying the flowing fluid.

16. Apparatus according to claim 14, wherein said differential pressure generating means is a conical shape element having a conical surface against the flow direction.

17. Apparatus according to claim 16, wherein at least one electrode is arranged in a section of said pipe adjacent to a thick end of said conical surface.

18. Apparatus according to claim 16, comprising at least one electrode arranged in a section of said pipe near said conical surface.

* * * * *

UNITED STATES PATENT AND TRADEMARK OFFICE
CERTIFICATE OF CORRECTION

PATENT NO. : 7,481,118 B2  
APPLICATION NO. : 11/883575  
DATED : January 27, 2009  
INVENTOR(S) : Nyfors Page 1 of 1

It is certified that error appears in the above-identified patent and that said Letters Patent is hereby corrected as shown below:

On the title page item "(73) Assignee: Roxar Flow Measurement AS (NL)" should be: --(73) Assignee: Roxar Flow Measurement AS (NO)--

Signed and Sealed this

Seventh Day of April, 2009

JOHN DOLL  
*Acting Director of the United States Patent and Trademark Office*